US012147587B2

(12) United States Patent
Hustava (10) Patent No.: US 12,147,587 B2
(45) Date of Patent: Nov. 19, 2024

(54) SECURE SERIAL BUS WITH AUTOMOTIVE APPLICATIONS (71) Applicant: SEMICONDUCTOR COMPONENTS INDUSTRIES, LLC, Phoenix, AZ (US)

(72) Inventor: Marek Hustava, Bratislava (SK)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 254 days.

(21) Appl. No.: 17/702,175

(22) Filed: Mar. 23, 2022

(65) Prior Publication Data
US 2022/0366090 A1 Nov. 17, 2022

Related U.S. Application Data (60) Provisional application No. 63/189,581, filed on May 17, 2021.

(51) Int. Cl.
G06F 21/72 (2013.01)
H04L 12/40 (2006.01)

(52) U.S. Cl.
CPC ........ *G06F 21/72* (2013.01); *H04L 12/40013* (2013.01); H04L 2012/40273 (2013.01)

(58) Field of Classification Search
CPC ........ G06F 21/72; G06F 21/606; G06F 21/85; G06F 13/4291; G06F 13/4282; G06F 21/55; H04L 12/40013; H04L 2012/40273; H04L 12/40006; H04L 12/40071; H04L 25/03866; H04L 67/12; B60R 16/0231; H04W 4/38; B60W 50/00; B60W 2050/0002; B60W 2050/0045; G01R 31/3187
See application file for complete search history.

(56) References Cited

U.S. PATENT DOCUMENTS

| 4,304,962 | A | 12/1981 | Fracassi et al. |
| 6,678,707 | B1 * | 1/2004 | Butler ............ G06F 7/588 708/250 |
| 9,792,246 | B2 | 10/2017 | Teoh et al. |
| 10,375,252 | B2 | 8/2019 | Lablans |
| 10,756,925 | B2 | 8/2020 | Hustava et al. |
| 11,882,619 | B2 * | 1/2024 | Nakajo ............ H04W 76/19 |

(Continued)

OTHER PUBLICATIONS

Marek Hustava et al., "DSI3 Bus With Enhanced Robustness," U.S. Appl. No. 17/585,531, as-filed on Jan. 26, 2022, 34 pages.

(Continued)

*Primary Examiner* — Amie C. Lin
(74) *Attorney, Agent, or Firm* — Ramey LLP (57) ABSTRACT Secure serial bus communication methods and devices suitable for automotive applications. An illustrative sensor IC includes: a sensor controller that operates a transducer to obtain measurement data formattable as data packets; a scrambler that masks each data packet with a scrambling operation before that data block is sent via a serial bus to a bus controller device, said scrambling operation having a secret configuration and/or secret initial state; and an integrated circuit component that operates on a seed value to derive the secret configuration and/or secret initial state.

20 Claims, 5 Drawing Sheets (56) References Cited

U.S. PATENT DOCUMENTS

| | | | | |
|---|---|---|---|---|
| 2005/0163238 A1* | 7/2005 | Fujii | ................ | H04L 27/26134 |
| | | | | 375/E1.005 |
| 2007/0291933 A1* | 12/2007 | Evans | .................. | H04L 9/0643 |
| | | | | 380/28 |
| 2014/0310527 A1 | 10/2014 | Veugen et al. | | |
| 2016/0080033 A1* | 3/2016 | Kim | ....................... | H04L 45/60 |
| | | | | 375/220 |
| 2016/0188523 A1* | 6/2016 | Teoh | .................. | G06F 13/1668 |
| | | | | 710/105 |
| 2019/0268452 A1* | 8/2019 | Yu | ........................ | H04L 69/324 |
| 2020/0153653 A1* | 5/2020 | Hustava | ................ | H04L 67/12 |

OTHER PUBLICATIONS

Denso Corporation, Freescale Semiconductor Inc. and TRW Automotive Inc., "DSI3 Bus Standard", Feb. 16, 2011, 45 pages.

Wikipedia, "A5/1", Retrieved from https://en.wikipedia.org/w/index.php?title=A5/1&oldid=1070343425, Feb. 7, 2022, 7 pages.

Wikipedia, "Alternating step generator," Retrieved from https://en.wikipedia.org/w/index.php?title=Alternating_step_generator&oldid=997803234, Jan. 2, 2021, 2 pages.

Wikipedia, "Scrambler," Retrieved from https://en.wikipedia.org/w/index.php?title=Scrambler&oldid=1056433330, Nov. 21, 2021, 5 pages.

Search Report for counterpart German Patent Application No. 10 2022 111 436.8, dated Feb. 17, 2023, 15 pages.

\* cited by examiner

FIG. 8

SECURE SERIAL BUS WITH AUTOMOTIVE APPLICATIONS

CROSS-REFERENCE TO RELATED APPLICATIONS

The present application claims benefit of provisional U.S. App. 63/189,581, filed 2021 May 17 and titled "Data Communication System and Method" by inventor Marek Hustava. This provisional is hereby incorporated herein by reference.

The present application relates to co-pending U.S. application Ser. No. 17/585,531, filed 2022 Jan. 26 and titled "DSI3 Bus with Enhanced Robustness" by inventors Marek Hustava and Tomas Suchy. This application is hereby incorporated herein by reference.

BACKGROUND

Current and future vehicles are incorporating increasing numbers of on-board sensors and systems to enable or aid critical vehicle functions including Adaptive Cruise Control (ACC), Parking Assistance, Forward Collision Warning (FCW), Forward Collision with Active Braking, Blind Spot Warning (BSW), Lane Keeping Systems (LKS), and others. These technologies provide direct driver assistance in normal driving and critical scenarios, and some are even capable of enhancing driver control or providing autonomous control to prevent or mitigate a crash or other negative outcome.

To accommodate the many sensors, actuators, and control systems being employed for such features, manufacturers are implementing increasingly sophisticated data communication networks in each vehicle. The 3rd generation Distributed System Interface (DSI3) standard published by the DSI Consortium (dsiconsortium.org) provides one example of such a communication network intended for automotive applications, but other examples are DS2, PSIS, LIN, and CAN standards.

DSI3 and these other communication standards must contend with a unique set of circumstances that challenge their performance. The networks are portable, battery powered (i.e., low voltage), with wire runs long enough to cause (and to be susceptible to) electromagnetic interference (EMI). The networks should be resistant to vibration effects, yet remain inexpensive and easy to repair. Shared features of these standards include the use of serial communications over one or two data transport conductors, limited bandwidths, and signaling schemes intended to cope with the above-identified circumstances.

As the complexity and capability of advanced driver assistance systems continues to increase, concerns are growing over their vulnerabilities to cyberattacks and data breaches. In addition to potentially harming the system itself, such incidents carry the potential for harm to passengers and pedestrians. However, attempts to secure such systems against such attacks should preferably avoid impairing the performance of such systems or unduly increasing their complexity and cost.

SUMMARY

Accordingly, there are disclosed herein secure serial bus communication methods and devices suitable for automotive applications. An illustrative sensor IC includes: a sensor controller that operates a transducer to obtain measurement data formattable as data packets; a scrambler that masks each data packet with a scrambling operation before that data block is sent via a serial bus to a bus controller device, said scrambling operation having a secret configuration and/or secret initial state; and an integrated circuit component that operates on a seed value to derive the secret configuration and/or secret initial state.

An illustrative communication method includes: receiving a seed value via an automotive serial bus from a bus controller device; operating on the seed value with an integrated circuit component to derive a secret configuration and/or secret initial state for a scrambler; using the scrambler to mask data packets; and sending the masked data packets via the automotive serial bus to the bus controller device.

An illustrative automotive sensor network includes: multiple sensor devices each having a free-running scrambler to mask data packets from that sensor device; and a bus master device coupled to the multiple sensor devices by a serial bus to receive masked data packets from each of the multiple sensor devices, the bus master device being configured to track a descrambler state for each of the multiple sensor devices.

Each of the foregoing embodiments may be employed separately or conjointly, and may optionally include one or more of the following features in any suitable combination: 1. the seed value is one of: a unique identifier for the integrated circuit device, and a value supplied by the bus controller device. 2. the scrambler is a multiplicative scrambler. 3. the scrambler is a nonlinear scrambler. 4. the scrambler is an alternating step generator having mutually prime register lengths of at least 100 cells. 5. a descrambler that unmasks command messages from the bus controller device. 6. the scrambling operation has a secret initial state. 7. the sensor controller resets the scrambler to the secret initial state after detecting a retransmission request. 8. the sensor controller disables further communication if a number of retransmission requests exceeds a predetermined limit. 9. the integrated circuit component comprises built-in self-test (BIST) circuitry that provides the secret configuration and/or secret initial state as a test result. 10. the integrated circuit component comprises a filter that operates on the seed value to produce truncated bits from which the secret configuration and/or secret initial state are derived. 11. the scrambler is used to mask multiple data packets without being reset between the data packets. 12. detecting a retransmission request for a given data packet; resetting the scrambler to the secret initial state; using the scrambler to mask the given data packet; and sending the masked given data packet via the automotive serial bus to the bus controller device. 13. disabling further communication if the seed value is not received within a predetermined window. 14. a free-running scrambler to mask command messages to each of the multiple sensor devices, the bus master device being configured to track a separate scrambler state for each of the multiple sensor devices.

DETAILED DESCRIPTION

The attached drawings and following description set out particular embodiments and details for explanatory purposes, but it should be understood that the drawings and corresponding detailed description do not limit the disclosure. On the contrary, they provide a foundation that, together with the understanding of one of ordinary skill in the art, discloses and enables all modifications, equivalents, and alternatives falling within the scope of the appended claims.

Figure 1:
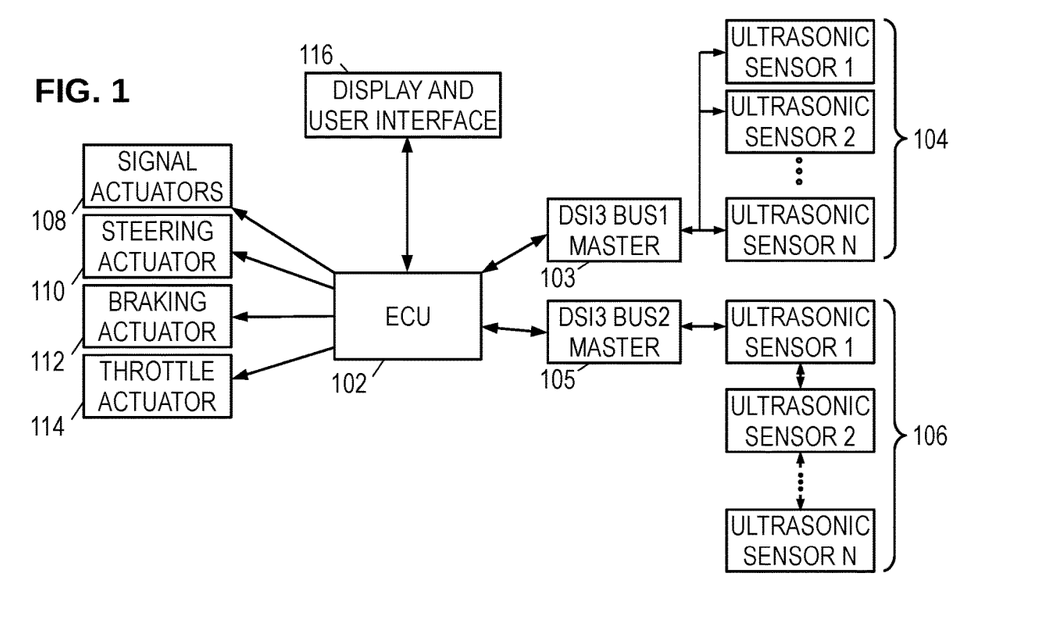
FIG. 1 is a block diagram of an illustrative data communication network.

FIG. 1 shows an electronic control unit (ECU) 102 coupled via a first bus master device 103 to a first set of ultrasonic sensors 104, and via a second bus master device 105 to a second set of ultrasonic sensors 106. The ECU 102 acquires measurements from the ultrasonic sensors and optionally from other sensors (e.g., radar, lidar, imaging) to determine a spatial relationship of the vehicle to its surroundings and any obstacles therein. To provide automated parking, assisted parking, lane-change assistance, obstacle and blind-spot detection, autonomous driving, and other desirable features, the ECU 102 may further connect to a set of actuators such as a turn-signal actuator 108, a steering actuator 110, a braking actuator 112, and throttle actuator 114. ECU 102 may further couple to a user-interactive interface 116 to accept user input and provide a display of the various measurements and system status.

Various standards exist to support communications between the ECU 102 and the various sensors and actuators. Of particular interest with respect to the present disclosure is the 3rd generation Distributed System Interface (DSI3) bus standard, which provides for half-duplex single-ended signal communication between a bus master device and one or more slave devices (e.g., the sensors and actuators). Because the DSI3 bus requires only one signal conductor, it may at times be referred to as a "one-wire" bus. Other suitable standards include DS2, PSI5, LIN, and CAN standards. For communication between the ECU 102 and nearby integrated circuit devices (e.g., bus masters 103, 105), inter-chip standards such as SPI, I2C, MDIO, may be preferred. As the I2C and MDIO standards typically provide for separate data and clock conductors, they are sometimes referred to as a "two-wire" bus. SPI and other inter-chip communication standards typically provide additional conductors for control signals and/or unidirectional data signals. Though the following discussion focuses on DSI3, the disclosed principles for securing data communications can be applied to the data signals for any of these serial bus standards.

The DSI3 standard supports parallel connection of multiple slave devices 104 to the bus master 103, and further supports series connection of multiple slave devices 106 to the bus master 105. Point-to-point connections are also supported.

Figure 2A:
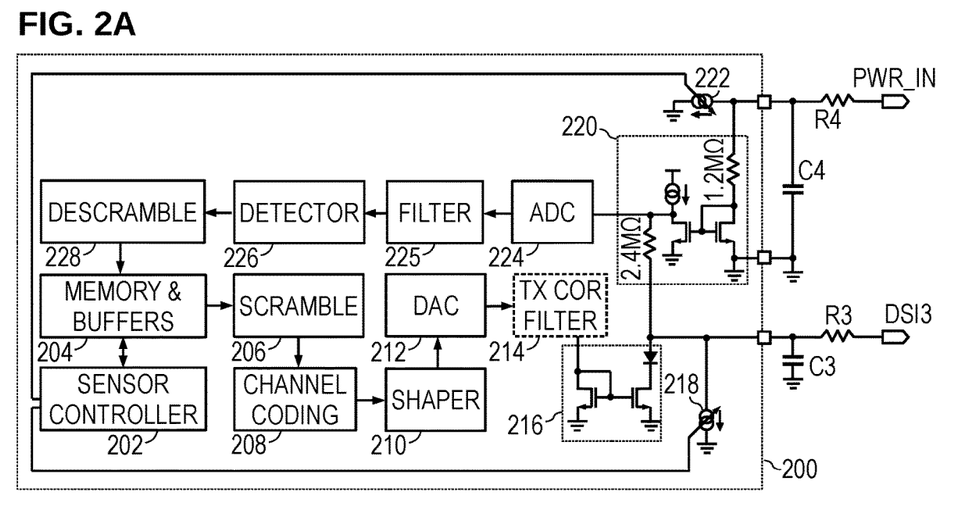
FIG. 2A is a block diagram of an illustrative slave device for a DSI3 bus.

FIG. 2A is a block diagram of an illustrative sensor device 200 suitable for connection as a slave device to a standard DSI3 bus having a parallel or point-to-point connection of the slave devices to the master device. While maintaining physical compatibility with the DSI3 standard, the illustrative device 200 includes certain features to enhance communications performance, at least some of which extend the standard in a way that may necessitate a firmware adjustment in the bus master device as discussed further below. Other features can be employed to enhance performance without departing from full compatibility with the existing standard. In addition to those features disclosed in co-owned U.S. Pat. No. 10,756,925 ("Slave Device Enhancing Data Rate of DSI3 Bus") and U.S. Pat. No. 10,771,281 ("Semi-differential signaling for DSI3 bus enhancement"), and co-pending U.S. application Ser. No. 17/585,531 ("DSI3 Bus with Enhanced Robustness"), there are herein disclosed certain features that protect bus communications from interception by, and interaction with, unauthorized devices. These features can be employed individually or in various combinations.

Sensor device 200 includes a controller 202 that collects measurements and buffers relevant messages in memory 204 for communicating the measurement data to the bus master device. While the message length can be varied, in at least one contemplated embodiment each message is 16 bytes and may begin with or be preceded by a preamble that is one or two nibbles in length. A scrambler 206 masks each message using a linear or non-linear feedback shift register and a bitwise exclusive-or (XOR) operation to protect the messages from interception and modification. If present, the preamble is not masked, so as to preserve the preamble pattern in the scrambler's output bitstream.

A channel encoder 208 encodes the bitstream from the scrambler 206 by mapping each nibble to a corresponding triplet of channel symbols. Each triplet includes three ternary channel symbols. Channel symbols are also referred to herein as "chips" and are transmitted as one of three unipolar non-return-to-zero levels: 0, 1, or 2, each symbol having a fixed symbol duration which may be about 3 or 4 microseconds. As provided in the standard, "0" may correspond to a quiescent channel signal current of $I_Q$. A "1" may correspond to a response channel signal current of $I_Q+I_{RESP}$, and a "2" may correspond to a response channel signal current of $I_Q+2I_{RESP}$. In at least some embodiments, $I_Q$ is limited to no more than 2 mA, and $I_{RESP}$ is approximately 12 mA. Some contemplated embodiments may switch from three-level signaling to two level signaling to improve noise immunity. In such embodiments, the channel encoder 208 maps 8-bit bytes to 8-bit codewords, in this case only $I_Q$ and $I_Q+2I_{RESP}$ current levels are used.

A pulse-shaping filter 210 may operate on the channel symbol stream from the encoder 208, providing a transfer function that converts rectangular pulses (e.g., NRZ chips) into smoother pulse shapes that provide the channel signal with more desirable spectral properties. A digital-to-analog converter 212 operates on the filtered channel signal to convert it from digital form to analog form, which herein may be termed the uplink channel signal. An optional transmit correction filter 214 may operate on the uplink channel signal to further shape the channel signal spectrum. A channel driver 216 converts the uplink channel signal into an electrical current on an input/output pin of the slave device 200. A low pass RC filter (capacitor C3, resistor R3) couples the input/output pin to the signal conductor of the DSI3 bus.

Current biasing of the input/output pin is provided by a current sink 218 and a receive buffer 220. Controller 202 adjusts the current sink 218 as needed for biasing during the forward (downlink) and reverse (uplink) communication phases of the half-duplex DSI3 communication protocol. During the downlink communication phase, the input/output pin receives a downlink channel signal in the form of an electrical voltage signal. Receive buffer 220 provides a high input impedance for the input/output pin, buffering the downlink channel signal for the analog-to-digital converter 224.

A downlink receive filter 225 may limit the digital receive signal bandwidth and/or enhance signal to noise ratio of the downlink signal. In at least some embodiments, the filter 225 operates to suppress noise above 300 kHz. In system embodiments where the master device employs a transmit correction filter (similar to filter 214 above), the downlink receive filter 225 may include a compensation function to boost downlink signal frequencies up to about 150 kHz, before rolling off to suppress noise at signal frequencies above about 250 or 300 kHz.

A symbol detector 226 operates on the filtered receive signal to either detect the channel symbols of the masked command message (when the device is operating in the command-response mode) or to detect a broadcast read command (BRC) pulse (when the device is operating in periodic data collection mode). A descrambler 228 operates on the masked command message, using a linear or non-linear feedback shift register and a bitwise exclusive-or (XOR) operation to unmask the command type and the associated payload, placing the information in the receive buffer for the controller 202 to use when formulating a response. In the periodic data collection mode, the detector 226 signals the sensor controller 202 to formulate a data packet for transmission in the appropriate TDMA slot.

FIG. 2A shows both a pulse-shaping filter 210 and a transmit correction filter 214. Either or both of these filters may be omitted. The filter order can also be interchanged, with the digital-to-analog conversion occurring before, between, or after the filtering operations. As described in incorporated U.S. application Ser. No. 17/585,531 ("DSI3 Bus with Enhanced Robustness"), detector 226 may be configured to detect retransmission requests, whether signaled using different BRC pulse widths or by slow variation of the input/output line voltage while other slave devices are modulating the bus current.

Figure 2B:
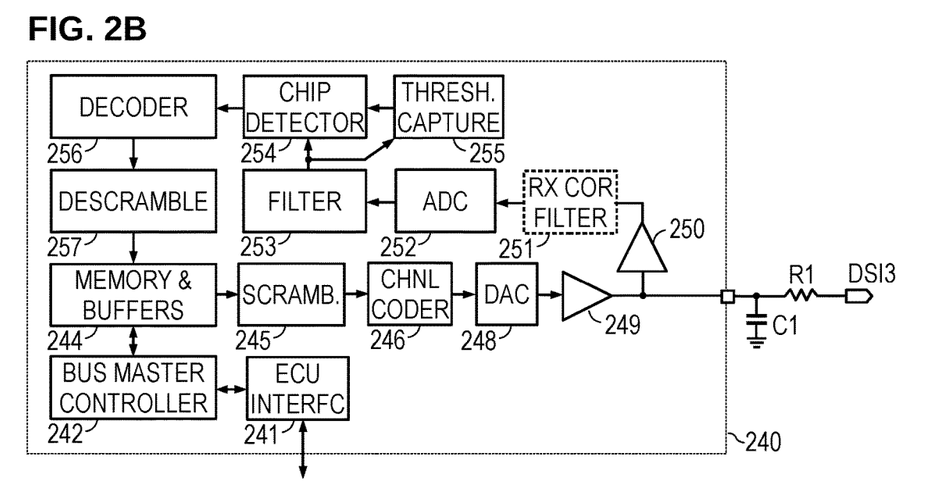
FIG. 2B is a block diagram of an illustrative master device for a DSI3 bus.

FIG. 2B is a block diagram of an illustrative bus master device 240 suitable for use on a standard DSI3 bus. As with the slave device 200, the master device 240 maintains physical compatibility with the DSI3 standard, but may include certain features to enhance uplink communication performance when employed in conjunction with a compatible slave device.

Master device 240 includes a controller 242 that formulates downlink messages in memory 244 for communication to one or more slave devices. When the bus is configured for command-response mode, the downlink messages are typically commands directed to a specific slave device to obtain a response. When the bus is configured for periodic data collection mode, the controller may directly initiate transmission of a pulse representing a broadcast read command (BRC) that provides a timing reference for a TDMA frame, during which sensor devices transmit packets in their assigned slots. As described in incorporated U.S. application Ser. No. 17/585,531 ("DSI3 Bus with Enhanced Robustness"), controller 242 may be further configured to generate retransmission requests, potentially using different BRC pulse widths or by causing slow variation of the input/output line.

A scrambler 245 masks each command message using a linear or non-linear feedback shift register and a bitwise exclusive-or (XOR) operation to protect the messages from interception and modification. (The scrambling operation may be bypassed for BRC pulses and any synchronization preamble for the command messages.) A channel encoder 246 encodes the masked downlink messages by mapping bits 0 and 1 to upward and downward channel voltage transitions as provided by, e.g., Manchester-1 encoding. A digital-to-analog converter 248 converts the encoded signal into an analog downlink signal. A driver 249 supplies the analog downlink signal as a voltage signal to an input/output pin of the master device 240. Though the DSI3 standard provides for a 2 volt swing between "high" and "low" symbol voltages, some contemplated embodiments employ a 4 volt swing to enhance noise immunity. A low pass RC filter (capacitor C1, resistor R1) couples the input/output pin to the signal conductor of the DSI3 bus.

A high impedance receive buffer 250 couples the uplink signal from the input/output pin to an optional receive correction filter 251. The optional receive correction filter 251 may, e.g., boost high frequency content of the uplink signal to compensate for operation of the transmit correction filter 214. An analog to digital converter 252 digitizes the uplink signal, and an uplink receive filter 253 operates on the digital signal to limit signal bandwidth and/or enhance signal-to-noise ratio. Filter 253 may be a matched filter, having a filter response based at least in part on the pulse shape provided by the pulse shaping filter 210. Filters 251 and 253 can be re-ordered, merged into a single filter, and each implemented in digital or analog form.

A chip detector 254 operates on the filtered uplink signal to detect channel symbol levels. A threshold capture unit 255 may capture and/or adapt comparator threshold levels for the chip detector 254 based at least in part on the message preambles as discussed in the co-owned patents identified above. A decoder 256 operates on the channel symbol sequence from the chip detector 254, inverting the operation of encoder 208 to map the chip triplets to binary nibbles. A descrambler 257 operates on the masked bitstream from the decoder 256, inverting the operation of the scrambler 206 to extract the message data sent by the slave device. The message data may be stored in memory 244 for analysis and use by controller 242.

The illustrative slave device illustrated in FIG. 2A employs a channel driver 216 and receive buffer 220 that operates with reference to ground. We observe here that the ground node can drift with respect to the ground used by the master device, typically in a symmetric fashion with the drift experienced by the voltage supply nodes of the master and slave devices. (The symmetry is a result of the power supply conductor impedances on the DSI3 bus.) Consequently, a greater degree of noise immunity can be achieved if, rather than using the ground node as a reference for signal transmission and reception, the slave and master devices use a half-voltage reference as described in the co-owned patents identified above. Accordingly, at least some contemplated embodiments of the slave and master devices use a half-voltage node as the reference voltage for sending and receiving signals on the DSI3 bus.

Per the standard, DSI3 master devices communicate with slave devices in a half-duplex fashion. The bus can operate in a command and response mode (CRM), or where higher data throughputs are desired, in a periodic data collection mode (PDCM). In CRM, the bus master sends a multi-byte command word addressing a command to an individual slave device and receives a response from that device. In PDCM, the bus master sends a broadcast read command (BRC) pulse, which initiates a time division multiple access (TDMA) frame having an allocated time slot for each of the active sensors. Each active sensor responds, sending a data packet to the master during its allocated time slot.

The bus is initially in CRM, where the master device sends commands to the sensor devices. The first action of the master device is preferably to provide each sensor device with an initial configuration for its scrambler 206 and descrambler 228, as described in greater detail below. The initial configurations for each sensor device can be different, or alternatively they may all share the same initial configuration. To enable the scramblers to be free-running (meaning that the scramblers are not reset for each communication), the master device preferably maintains a separate session for each sensor device, storing the states of scrambler 245 and descrambler 257 after receiving a message from a given sensor device and reinstating those states before the next communication with that device. In at least some contemplated implementations, the sensor devices will decline to communicate until their scramblers 206 have been initialized. If communication is attempted more than a predetermined number of times, the sensor devices may shut down until the next time the power is cycled.

When initiating a measurement cycle, the master device may send command messages specifying which of the sensors will be active and the type of measurement they are to perform. Illustrative measurements include transmit and receive; and receive only ("listen"). Measurement parameters may further include frequency channels, e.g., upper sideband, lower sideband, and wideband, to enable multi-channel operation. The command may further specify the allocation of TDMA slots to the various slave devices, though it is expected that the slave devices can rely on their bus identifiers to determine their allocation, e.g., transmitting in numerical order.

Figure 3:
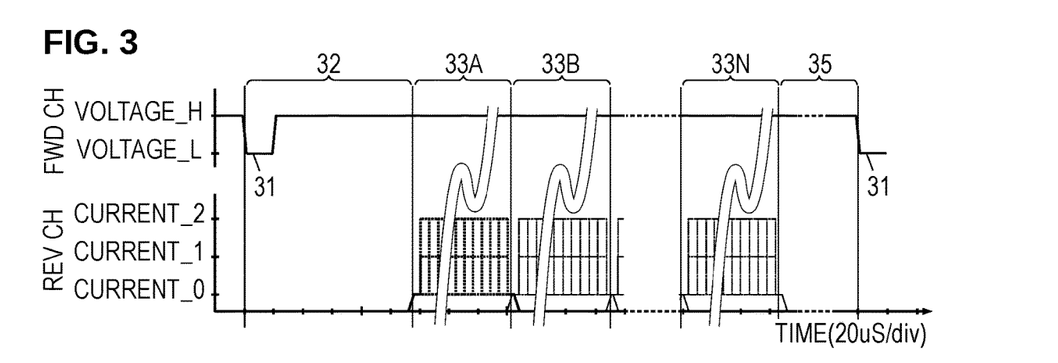
FIG. 3 is a graph of an illustrative TDMA frame syntax.

FIG. 3 is a graph of an illustrative TDMA frame syntax that may be used once the master device transitions the bus to PDCM. The master device communicates to the slave devices over the forward, or "downlink", channel by modulating the voltage of the input/output signal line, and the slave devices communicate to the master device over the reverse, or "uplink", channel by modulating the current on the input/output signal line. A BRC pulse 31 initiates each TDMA frame. After a programmable interval 32, which FIG. 3 shows as being measured from the falling edge of the BRC pulse but which can alternatively be measured from the rising edge, the active slave devices begin taking turns transmitting a packet containing their measurement data. In at least some systems, each sensor needs to convey multiple data packets, which would necessitate multiple TDMA frames because each sensor can only send one fixed length data packet per frame. Each TDMA slot 33A-33N contains one data packet from a corresponding sensor. The master device may delay the beginning of the next frame by a programmable interval 35.

In at least some contemplated implementations, each data packet includes a parity check, a checksum, or other form of redundancy to enable error detection. Even in implementations without such redundancy, the master device can monitor equalization error or another indicator of excessive noise to detect when a packet has not been reliably received. Upon detecting an error in a data packet or the presence of excessive noise during its reception, the master device requests retransmission of that data packet. As described in incorporated U.S. application Ser. No. 17/585,531 ("DSI3 Bus with Enhanced Robustness"), the master device may employ a modified BRC pulse or slow voltage variation to request retransmission of a data packet. Upon detecting a retransmission request, the relevant sensor device may restore its scrambler and descrambler to the configurations initially set by the master device.

Figure 4:
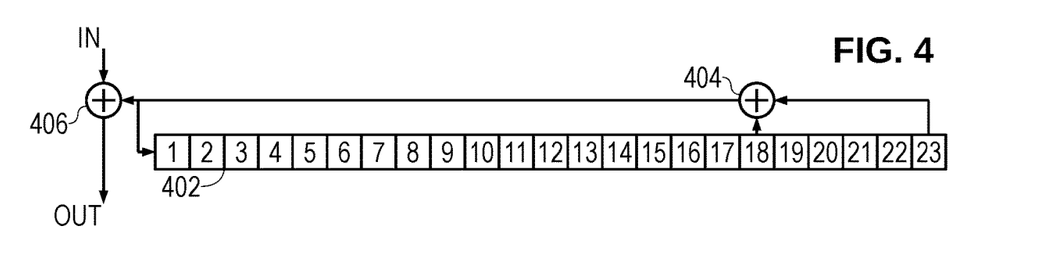
FIG. 4 is a signal flow diagram of an illustrative additive scrambler/descrambler.

FIG. 4 shows an additive linear scrambler, which includes a shift register 402 that accepts a feedback signal. Values from selected cells of the shift register 402 are combined by one or more exclusive OR (XOR) gates 404 to generate the feedback signal. The selected cells are typically chosen to ensure that the feedback signal is a maximal length pseudorandom binary sequence (PRBS), at least so long as the shift register is initialized to a nonzero value. A masking XOR gate 406 combines the feedback signal with the data stream (IN) to provide a masked data stream (OUT). The shift register preferably includes 60 or more cells, and even more preferably includes about 128 cells to make it more difficult for unauthorized persons to derive the masking pattern from the masked data stream.

At the receiving end, the same PRBS is generated by an identically configured and initialized shift register 402. An XOR gate 406 combines the masked data stream (IN) with the PRBS to restore the original unmasked data stream (OUT). If an error occurs in the initialization (e.g., due to a communication error when conveying the initial value or a seed from which the initial value is generated), the descrambler's PRBS does not match and the whole message is corrupted. An alternative is to use a predetermined value, but this may create vulnerabilities to reverse engineering.

Figure 5A:
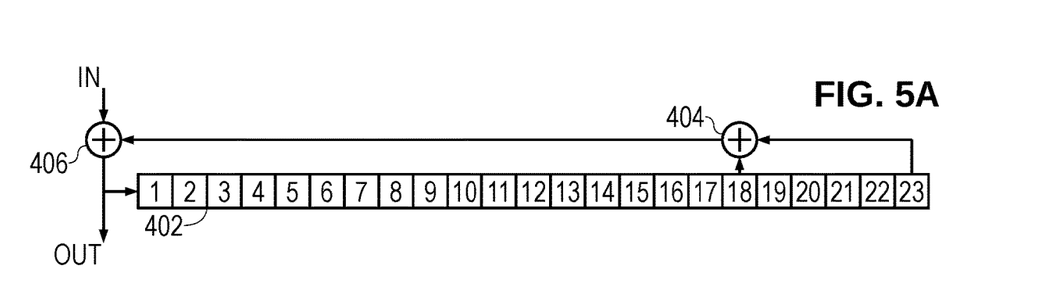
FIG. 5A is a signal flow diagram of an illustrative multiplicative scrambler.
Figure 5B:
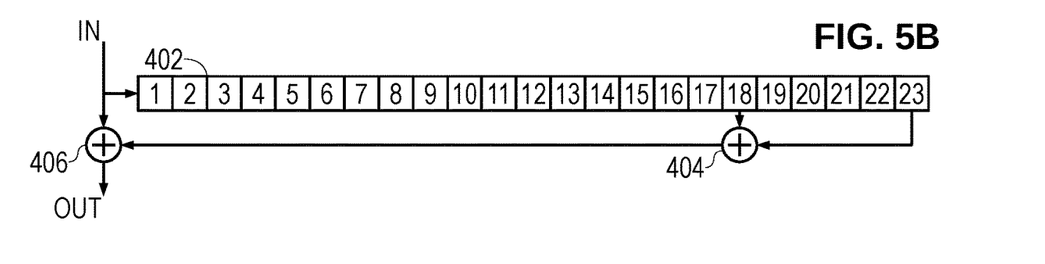
FIG. 5B is a signal flow diagram of an illustrative multiplicative descrambler.

FIG. 5A shows a multiplicative linear scrambler, which may be preferred due to its ability to limit error propagation. Rather than accepting the feedback signal directly, the shift register 402 accepts the masked data stream (OUT) from the masking XOR gate 406. The one or more XOR gates 404 then derive the feedback signal from the masked data stream itself. At the receiving end, the descrambler is configured as shown in FIG. 5B, feeding the masked data stream (IN) into the shift register 402, and using one or more XOR gates 404 to derive the feedback signal for masking XOR gate 406 to reconstruct the original data stream (OUT). The effect of any communication errors is limited to the immediate neighborhood of the communication error.

Figure 6:
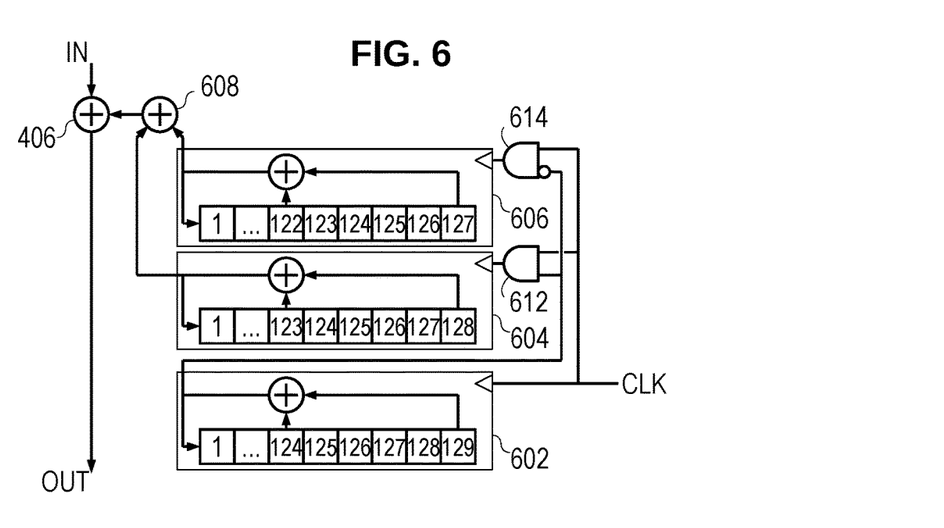
FIG. 6 is a signal flow diagram of an illustrative additive nonlinear scrambler/descrambler.
Figure 7A:
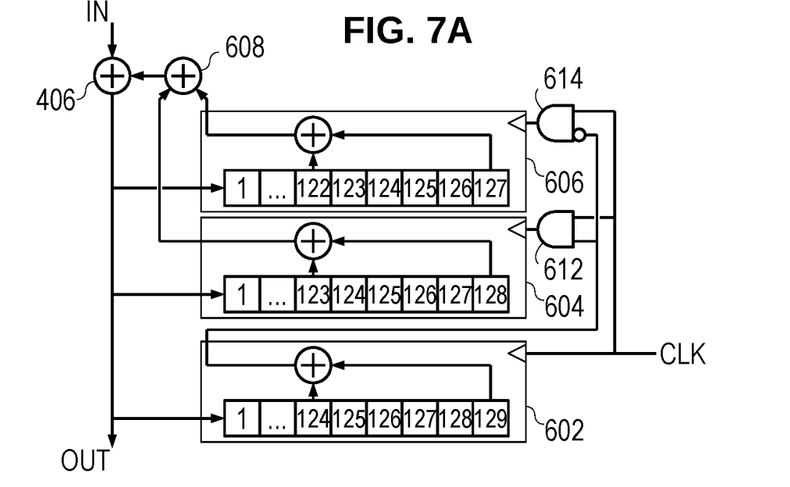
FIG. 7A is a signal flow diagram of an illustrative multiplicative nonlinear scrambler.

The linear scramblers of FIG. 4 and FIG. 5A may be satisfactorily secure for sufficiently long shift registers, but stronger protection can be achieved with nonlinear scramblers such as those shown in FIGS. 6 and 7A. The illustrated nonlinear scramblers are "alternating step generators", with a first linear shift feedback register (LSFR) 602 generating a PRBS as described previously with reference to FIG. 4. A clock signal CLK is supplied to the first LSFR 602 to shift the register contents and generate the next PRBS bit with each clock cycle. The PRBS is then used to gate the clock signal CLK for two additional LSFRs 604, 606. When the PRBS is asserted (logical "1"), logic gate 612 passes the clock signal CLK to LSFR 604. When the PRBS signal is deasserted (logical "0"), logic gate 614 instead passes the clock signal CLK to LSFR 606. A combining XOR gate 608 derives a mask signal by combining the PRBS's from LSFRs 604, 606, supplying it to masking XOR gate 406. The registers for LSFRs 602, 604, 606 preferably have comparable register lengths that are pairwise mutually prime (i.e., having 1 as their greatest common factor), each with more than 100 cells.

Figure 7B:
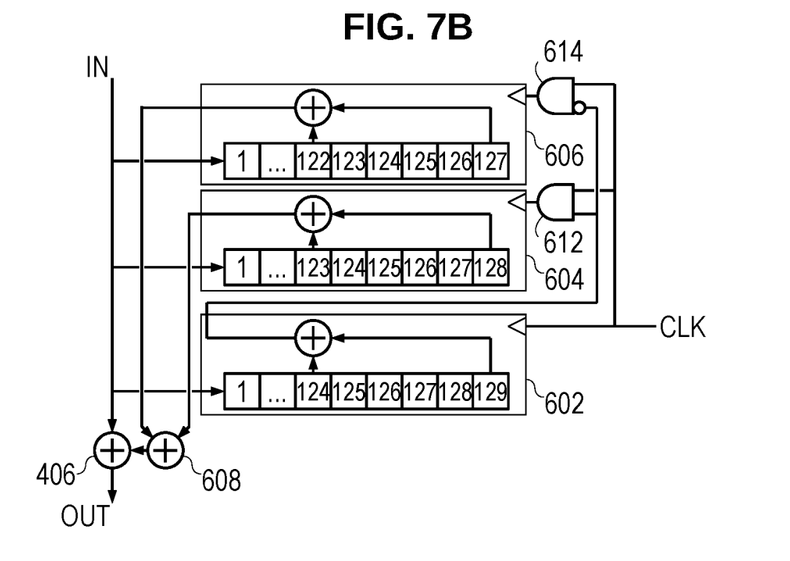
FIG. 7B is a signal flow diagram of an illustrative multiplicative nonlinear descrambler.

The multiplicative counterpart of the scrambler in FIG. 6 is shown in FIG. 7A. That is, rather than operating on their individual feedback signals, the LSFRs 602, 604, 606 each operate on the masked data stream. At the receiving end, the masked data stream is supplied to each of the LSFRs 602, 604, 606 as shown in FIG. 7B, enabling them to derive the appropriate sequences that form the correct masking signal, which masking XOR gate 406 can then remove to restore the original data stream. The influence of any communication errors is limited to a window around the communication error.

Other nonlinear scrambling approaches exist, and may be used. One suitable example is the A5/1 stream cipher disclosed in the GSM cellular telephone standard. Shrinking generators and self-shrinking generators can also be employed, though they may need buffering and/or higher clock rates to overcome their variable production rates.

To maximize protection, the scrambler/descrambler configurations are established in a secure fashion. The configurations can be varied by selecting different combinations of cells to derive the PRBS from the shift register(s), by selecting different combinations of cells to derive the gating signal for the clock CLK, by varying the shift register length(s), and/or by varying the initial contents of the register(s). These parameters can be optionally established during initial system assembly, e.g., by securely storing the parameters, or multiple parameter sets for dynamic selection, in an embedded nonvolatile memory of both the master device and the sensor device. (The descrambler configurations are essentially the same as the scrambler configurations, enabling the descrambler to be readily configured once the scrambler configuration parameter(s) are known.) However this secure storage approach involves added complexity and cost to ensure that the stored parameters are protected from reverse engineering attacks.

A preferred approach is to employ proprietary processing of a seed value, which can either be stored in the clear or provided by the master device at start up. One contemplated implementation uses the Die Level Traceability (DLT) code as a seed value, ensuring that each sensor device's seed value is unique. The master device is programmed with the DLT information for each of the sensor devices when the system is assembled. Alternatively, the master device generates seed values dynamically and provides one to each sensor device.

Proprietary processing employs some aspect of the sensor device structure to derive one or more scrambler configuration parameters from the seed value. For example, integrated circuit devices routinely include built-in self-test (BIST) circuitry having registers for supplying test patterns to circuitry components and capturing test results. The seed value can be supplied to the existing BIST circuitry, enabling the relevant components of the sensor device to operate on the seed value as if it were a test pattern and produce a test result that can be taken as one or more scrambler configuration parameters. The master device can be designed to also include the relevant sensor device components, enabling the master device to independently derive the scrambler configuration parameters. Because there are far fewer master devices than sensor devices, incorporating the additional circuitry into the master device does not unduly raise system cost.

Functional components other than the BIST circuitry can be similarly employed. For example, ultrasonic sensor devices incorporate digital correlation filters. These filters calculate a sum of products, with the products being calculated from multiplication of a signal sample with a filter coefficient. The binary representation of each product is much longer than the representations of the coefficients and sample. For example, if the signal sample is 22 bits wide and the coefficient is 22 bits wide, the representation of their product is 44 bits wide. The useful dynamic range may be limited to about 16 bits, meaning that the 28 least significant bits may be truncated before or after the summation operation. The truncated bits may nevertheless be retained for other purposes, e.g., to provide scrambler configuration parameters. The sensor device could take a seed value from the master device, pass the seed value through the correlation filter, and accumulate the truncated bits for use as one or more scrambler configuration parameters. The master device would be designed to include a correlation filter with the same coefficient values, to enable the master device to independently derive the one or more scrambler configuration parameters from the seed value.

Multiple such functions can be employed in series. As one example, the seed value may be passed through the digital correlation filter and the truncation bits accumulated as a test pattern from which the BIST circuitry derives the scrambler configuration parameters. The use of existing sensor device components leverages the existing tried and true device designs and avoids unduly increasing their cost and complexity.

Figure 8:
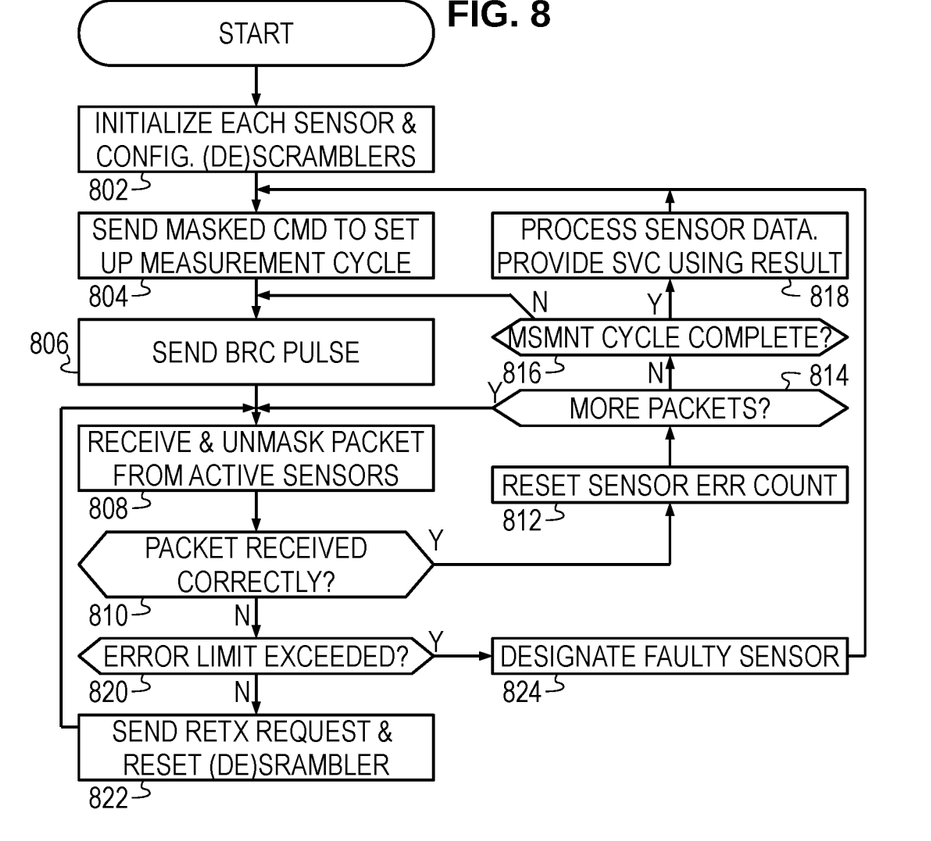
FIG. 8 is a flow diagram of an illustrative sensing method.

FIG. 8 is a flow diagram of an illustrative method that may be implemented by the master device. In block 802, uses CRM to initialize the scrambler/descrambler configuration of each sensor device. For example, the master device may send a first CRM command message to convey the seed value for proprietary processing as previously described to configure the sensor device's scrambler and descrambler. The sensor device's scrambler configuration need not be the same as the sensor device's descrambler configuration. The master device stores the corresponding descrambler and scrambler configuration for future communications with that sensor device, including contents of their shift registers. Each sensor device is configured in this fashion.

In block 804, using the appropriate scrambler setting for each sensor device selected to be active, the master device sends a masked CRM message to each sensor device specifying the measurement parameters to be used and optionally specifying the PDCM time slot(s) to be used by each sensor device to convey measurement information to the master device. Once each of the sensor devices have been configured, the master device initiates PDCM in block 806, sending a block read command (BRC) pulse to define time slots within a PDCM frame.

As the active sensor devices send masked data packets in response to the BRC pulse, the master device receives and unmasks each data packet in block 808. In block 810, the master device determines whether each data packet was received correctly (e.g., using the checksum bits), and if so, sets an error count for that sensor device to zero in block 812. In block 814, the master device determines whether more data packets are expected for that PDCM frame, and if so, returns to block 808. If the frame is complete, the master device checks in block 816 to determine whether the current measurement cycle is complete. If not, control returns to block 806. Otherwise, the data from the current measurement cycle is processed in block 818 and provided to support whichever driver assistance service initiated the measurement. Control returns to block 804 to initiate the next measurement cycle.

If in block 810, the data packet is not correctly received, the master device increments an error counter for that sensor in block 820 and tests whether the counter exceeds a predetermined limit. If not, the master device sends a retransmission request in block 822, resetting the scrambler configuration for that sensor to its initial value. (The sensor device detecting the retransmission request will also reset its scrambler configuration to its initial value. Note that the sensor device may impose a limit on the maximum number of retransmission requests and disable itself if that limit is exceeded.) The master device returns to block 808. If the counter does exceed the limit in block 820, the master device designates the sensor as faulty in block 824, aborting the measurement cycle. The master device may omit the faulty sensor device from future measurements.

One example embodiment of the present disclosure stores initial scrambler settings in Non-Volatile Memory (NVM) of the ECU and sensor devices. For example, the ECU software may be stored in FLASH memory. In this implementation the initial scrambler setting is stored in FLASH memory via the software and paired with a corresponding scrambler initial setting in the sensor NVM. This example embodiment pairs ECU software and peripheral nodes for increased security.

While example embodiments have been described with reference to ultrasonic sensors and engine control units, embodiments of the present disclosure may be used in other applications of controllers and peripheral devices as well. Specific examples have been made to the DSI3 bus protocol, however implementations of described embodiments may use other communication protocols as well. Example encryption methods have been given, such as hashing, CRC encryption, and signature verification; however, other encryption methods may be implemented. Example embodiments of the present disclosure may provide efficient and robust security to data processing systems.

The present technology has been described above with reference to several exemplary embodiments. However, changes and modifications may be made to the exemplary embodiments without departing from the scope of the present technology. For example, while an exemplary embodiment may describe a ECU and accompanying ultrasonic sensor implementing various security methods for communication protocols, one of skill in the art will understand the described methods may be used in other applications. In addition, exemplary specifications such as polynomial sizes and command frames have been described, but one of skill in the art will understand the present technology is not limited to such specifications. These and other changes or modifications are intended to be included within the scope of the present technology.

Numerous modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An integrated circuit device that comprises:
   a sensor controller that operates a transducer to obtain measurement data formattable as data packets;
   a scrambler that masks each data packet of the data packets with a scrambling operation before that data packet is sent via a serial bus to a bus controller device, said scrambling operation having a secret configuration or secret initial state, wherein the secret configuration or secret initial state protects bus communications from interception; and
   an integrated circuit component that derives the secret configuration or secret initial state by proprietary processing of a seed value that is one of: a permanent, unique identifier for the integrated circuit device, and a value supplied by the bus controller device.

2. The integrated circuit device of claim 1, wherein the scrambler is a multiplicative scrambler.

3. The integrated circuit device of claim 1, wherein the scrambler is a nonlinear scrambler.

4. The integrated circuit device of claim 1, wherein the scrambler is an alternating step generator having mutually prime register lengths of at least 100 cells.

5. The integrated circuit device of claim 1, further comprising a descrambler that unmasks command messages from the bus controller device.

6. The integrated circuit device of claim 1, wherein the scrambling operation has a secret initial state, and wherein the sensor controller resets the scrambler to the secret initial state after detecting a retransmission request.

7. The integrated circuit device of claim 6, wherein the sensor controller disables further communication if a number of retransmission requests exceeds a predetermined limit.

8. The integrated circuit device of claim 1, wherein the integrated circuit component comprises built-in self-test (BIST) circuitry that provides the secret configuration or secret initial state as a test result.

9. The integrated circuit device of claim 1, wherein the integrated circuit component comprises a filter that operates on the seed value to produce truncated bits from which the secret configuration or secret initial state are derived.

10. A communication method that comprises:
    receiving a seed value via an automotive serial bus from a bus controller device;
    operating on the seed value proprietarily with an integrated circuit component to derive a secret configuration or secret initial state for a scrambler, wherein the secret configuration or secret initial state protects against interception of bus communications;
    using the scrambler to mask data packets conveying measurement data obtained by a transducer operated by a sensor controller; and
    sending the masked data packets via the automotive serial bus to the bus controller device.

11. The method of claim 10, wherein the integrated circuit component comprises built-in self-test (BIST) circuitry that provides the secret configuration or secret initial state as a test result.

12. The method of claim 10, wherein the integrated circuit component comprises a filter that operates on the seed value to produce truncated bits from which the secret configuration or secret initial state are derived.

13. The method of claim 10, wherein the scrambler is used to mask multiple data packets without being reset between the data packets.

14. The method of claim 13, further comprising:
    detecting a retransmission request for a given data packet;
    resetting the scrambler to the secret initial state;
    using the scrambler to mask the given data packet; and
    sending the masked given data packet via the automotive serial bus to the bus controller device.

15. The method of claim 14, further comprising disabling further communication if a number of retransmission requests for a given data packet exceeds a predetermined limit.

16. The method of claim 10, further comprising disabling further communication if the seed value is not received within a predetermined window.

17. An automotive sensor network that comprises:
multiple sensor devices including a first sensor device and a second sensor device, the first sensor device having a free-running scrambler using a secret configuration or secret initial state, derived by proprietary processing of an externally supplied seed value, to protect bus communications from interception by masking data packets conveying measurement data obtained by a transducer operated by the first sensor device and the second device having a free-running scrambler using another secret configuration or another secret initial state, derived by proprietary processing of another externally supplied seed value, to protect bus communications from interception by masking data packets conveying measurement data obtained by another transducer operated by the second sensor device; and
a bus master device coupled to the multiple sensor devices by a serial bus to receive masked data packets from each of the multiple sensor devices including the masked data packets from the first sensor device and the masked data packets from the second sensor device, the bus master device being configured to track a descrambler state for each of the multiple sensor devices.

18. The automotive sensor network of claim 17, wherein the bus master device includes a free-running scrambler to mask command messages to each of the multiple sensor devices, the bus master device being configured to track a separate scrambler state for each of the multiple sensor devices.

19. The automotive sensor network of claim 18, wherein the bus master device's scrambler is an alternating step generator having mutually prime register lengths of at least 100 cells.

20. The automotive sensor network of claim 17, wherein the sensor device scramblers are nonlinear scramblers.

\* \* \* \* \*